United States Patent
Komatsu et al.

(10) Patent No.: US 12,236,724 B2
(45) Date of Patent: Feb. 25, 2025

(54) REPROGRAMMING TOOL (71) Applicant: SUBARU CORPORATION, Tokyo (JP)

(72) Inventors: Yusuke Komatsu, Tokyo (JP); Yoichi Izumi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 212 days.

(21) Appl. No.: 18/059,048

(22) Filed: Nov. 28, 2022

(65) Prior Publication Data

US 2023/0186694 A1 Jun. 15, 2023

(30) Foreign Application Priority Data

Dec. 13, 2021 (JP) .................. 2021-201763

(51) Int. Cl.
G07C 5/00 (2006.01)
G07C 5/08 (2006.01)
G06F 8/65 (2018.01)
H01R 31/08 (2006.01)

(52) U.S. Cl.
CPC .......... *G07C 5/008* (2013.01); *G07C 5/0808* (2013.01); *G06F 8/65* (2013.01)

(58) Field of Classification Search
CPC . G07C 5/00; G07C 5/08; H01R 31/08; H01R 29/00; G06F 8/65
See application file for complete search history.

(56) References Cited

U.S. PATENT DOCUMENTS

| 5,278,759 A * | 1/1994 | Berra ................. G06F 8/65 701/1 |
| 5,857,158 A * | 1/1999 | Zimmermann .... G05B 19/0426 701/115 |
| 6,138,059 A * | 10/2000 | Ozeki ................ G11C 5/14 701/1 |
| 6,704,894 B1 * | 3/2004 | Kania .............. G01R 31/31835 714/724 |
| 6,928,362 B2 * | 8/2005 | Meaney ................. F02D 41/26 701/115 |

(Continued)

FOREIGN PATENT DOCUMENTS

JP 2021-043734 A2 3/2021

*Primary Examiner* — Tan Q Nguyen
(74) *Attorney, Agent, or Firm* — Rimon P.C.

(57) ABSTRACT

A reprogramming tool includes a connector that is to be detachably coupled to a diagnostic connector with which a vehicle is provided. The diagnostic connector includes a vehicle-side first terminal and a vehicle-side second terminal. The vehicle-side first terminal is always coupled to a battery of the vehicle. The vehicle-side second terminal is coupled to the battery in a case where a power state of the vehicle is a state in which an ignition is ON. The connector of the reprogramming tool includes a tool-side first terminal and a tool-side second terminal. The tool-side first terminal is to be coupled to the vehicle-side first terminal of the diagnostic connector. The tool-side second terminal is to be coupled to the vehicle-side second terminal of the diagnostic connector. The reprogramming tool includes a short-circuit mechanism configured to short-circuit the tool-side first terminal and the tool-side second terminal.

9 Claims, 5 Drawing Sheets

(56) References Cited

U.S. PATENT DOCUMENTS

| | | | |
|---|---|---|---|
| 2010/0125388 A1* | 5/2010 | Nagatomo | B60W 50/0098 701/36 |
| 2014/0005881 A1* | 1/2014 | Hardesty | G07C 5/0808 701/32.8 |
| 2017/0197521 A1* | 7/2017 | Park | H02J 7/00306 |
| 2021/0234395 A1* | 7/2021 | Paatero | H02J 9/068 |

* cited by examiner

REPROGRAMMING TOOL

CROSS-REFERENCE TO RELATED APPLICATIONS

The present application claims priority from Japanese Patent Application No. 2021-201763 filed on Dec. 13, 2021, the entire contents of which are hereby incorporated by reference.

BACKGROUND

The disclosure relates to a reprogramming tool.

Recently, a technology for updating programs (hereinafter also referred to as reprogramming) for various electronic devices provided in vehicles has been proposed.

For example, Japanese Unexamined Patent Application Publication No. 2021-43734 discloses that an update tool for performing reprogramming (hereinafter referred to as a reprogramming tool) is coupled to a malfunction diagnostic connector provided in a vehicle to reprogram a controller installed in the vehicle.

SUMMARY

An aspect of the disclosure provides a reprogramming tool including a connector configured to be detachably coupled to a diagnostic connector with which a vehicle is provided. The diagnostic connector includes a vehicle-side first terminal and a vehicle-side second terminal. The vehicle-side first terminal is always coupled to a battery of the vehicle. The vehicle-side second terminal is coupled to the battery in a case where a power state of the vehicle is a state in which an ignition is ON. The connector of the reprogramming tool includes a tool-side first terminal and a tool-side second terminal. The tool-side first terminal is configured to be coupled to the vehicle-side first terminal of the diagnostic connector. The tool-side second terminal is configured to be coupled to the vehicle-side second terminal of the diagnostic connector. The reprogramming tool includes a short-circuit mechanism configured to short-circuit the tool-side first terminal and the tool-side second terminal.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

Reprogramming using a reprogramming tool is generally performed when the power state of a vehicle is a state in which the ignition is ON (hereinafter the state will be simply referred to as Ignition ON), that is, when power is supplied from the battery of the vehicle to a reprogramming target unit. However, when reprogramming is performed, there may be a case where the power state of the vehicle is unintentionally switched to a state in which the ignition is OFF (hereinafter the state will be simply referred to as Ignition OFF) due to, for example, misoperation or an automatic power off function, so that reprogramming is abnormally discontinued, and reprogramming cannot be normally performed.

It is desirable to provide a reprogramming tool that makes it possible to normally perform reprogramming.

In the following, embodiments of the disclosure will be described in detail with reference to the attached drawings. Specific dimensions, materials, numerical values, and so forth described in the embodiments are mere examples that facilitate understanding of the disclosure and are not intended to limit the disclosure unless otherwise noted. The drawings are schematic and are not intended to be drawn to scale. Note that, in the specification and the drawings, elements that have substantially the same functions and configurations are denoted by the same reference numerals, and redundant description is omitted. Moreover, illustration of elements that are not directly related to the disclosure is omitted.

Embodiment

Figure 1:
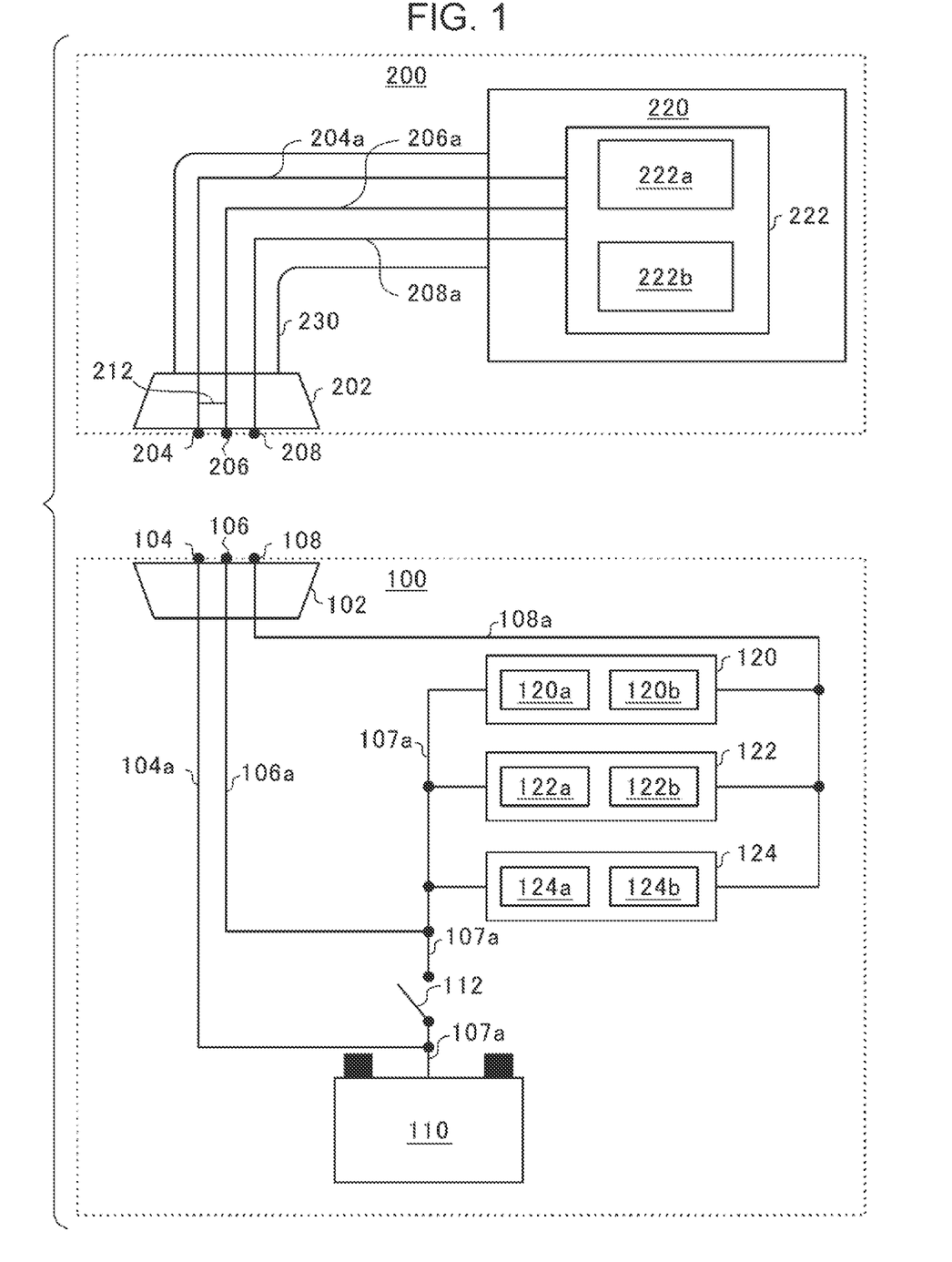
FIG. 1 is a functional block diagram for describing a reprogramming tool according to an embodiment of the disclosure and a vehicle.

FIG. 1 is a functional block diagram for describing a reprogramming tool 200 according to an embodiment of the disclosure and a vehicle 100. The vehicle 100 may be, for example, a hybrid vehicle that has an engine and a motor as vehicle driving sources.

As illustrated in FIG. 1, the vehicle 100 has a diagnostic connector 102 for establishing connection with an external device. The external device makes diagnosis of malfunctions or the like of the vehicle 100 or reprograms various controllers installed in the vehicle 100.

The diagnostic connector 102 has a vehicle-side first terminal 104, a vehicle-side second terminal 106, and a vehicle-side third terminal 108. The vehicle-side first terminal 104 is a +B terminal (positive terminal) that is always coupled to a battery 110 of the vehicle 100. The vehicle-side second terminal 106 is an ignition (IG) terminal for identifying whether the power state of the vehicle 100 is either Ignition ON or Ignition OFF. The vehicle-side third terminal 108 is a terminal for communication (hereinafter such a terminal will be simply referred to as a communication terminal).

As illustrated in FIG. 1, the vehicle-side first terminal 104 is electrically coupled, through a vehicle-side first line 104a and a vehicle-side fourth line 107a, to the battery 110 installed in the vehicle 100. The vehicle-side first terminal 104 is always coupled to the battery 110 through the vehicle-side first line 104a and the vehicle-side fourth line 107a regardless of the power state of the vehicle 100. Note that the vehicle-side first terminal 104 may always be coupled to the battery 110 through the vehicle-side first line 104a regardless of the power state of the vehicle 100.

The vehicle-side second terminal 106 can be electrically coupled to the battery 110 through a vehicle-side second line 106a and the vehicle-side fourth line 107a. The vehicle-side second line 106a is a line that couples the vehicle-side fourth line 107a to the vehicle-side second terminal 106. The vehicle-side fourth line 107a is a line that couples units 120, 122, and 124 provided in the vehicle 100 to the battery 110.

The vehicle-side fourth line 107a has an ignition (IG) relay 112 partway therealong. The IG relay 112 switches the power state of the vehicle 100, partway therealong. That is, when the IG relay 112 is controlled so as to be ON from OFF, the units 120, 122, and 124 and other electronic devices provided in the vehicle 100 are electrically coupled to the battery 110 through the vehicle-side fourth line 107a, and the power state of the vehicle 100 is switched to Ignition ON. Note that it is sufficient that units to which power is supplied in a case where the power state of the vehicle 100 is Ignition ON include at least, for example, a controller involved in driving of the vehicle 100. Alternatively, in a case where the power state of the vehicle 100 becomes Ignition ON when reprogramming is to be performed, it is sufficient that power be supplied from the battery 110 to at least units that are to be reprogrammed.

In a case where the IG relay 112 is ON, and the power state of the vehicle 100 is Ignition ON, the vehicle-side second terminal 106 of the diagnostic connector 102 is coupled to the battery 110 through the vehicle-side second line 106a and the vehicle-side fourth line 107a.

In contrast, when the IG relay 112 is controlled so as to be OFF from ON, the vehicle-side fourth line 107a is blocked. The units 120, 122, and 124 described above and the other electronic devices are thus electrically decoupled from the battery 110, and the power state of the vehicle 100 is switched to Ignition OFF. Moreover, the vehicle-side second terminal 106 of the diagnostic connector 102 and the battery 110 are also electrically decoupled from each other. Note that, for example, power cables may be used as the vehicle-side first line 104a, the vehicle-side second line 106a, and the vehicle-side fourth line 107a.

The vehicle-side third terminal 108 is coupled to the units 120, 122, and 124 of the vehicle 100 such that communication is possible through a vehicle-side third line 108a. Moreover, the units 120, 122, and 124 are coupled to each other such that communication is possible through the vehicle-side third line 108a. Note that, for example, a wired or wireless communication line supporting the Controller Area Network (CAN) protocol may be used as the vehicle-side third line 108a.

Note that the present embodiment illustrates a case where the vehicle-side third terminal 108 is provided in the diagnostic connector 102; however, the vehicle-side third terminal 108 is not necessarily provided in the diagnostic connector 102. For example, the vehicle-side third terminal 108 may be provided in a connector different from the diagnostic connector 102 of the vehicle 100.

Moreover, the present embodiment illustrates a case where the vehicle-side third terminal 108 is coupled to the units 120, 122, and 124 of the vehicle 100 such that communication is possible; however, a unit used to perform communication control (hereinafter simply referred to as a communication control unit) may be provided partway along the vehicle-side third line 108a between the vehicle-side third terminal 108 and the units 120, 122, and 124 of the vehicle 100. In this case, when the power state of the vehicle 100 becomes Ignition ON, it is preferable that power be supplied from the battery 110 also to the communication control unit. Note that, in this case, when reprogramming is to be performed and when the power state of the vehicle 100 becomes Ignition ON, it is sufficient that power be supplied from the battery 110 to at least a unit to be reprogrammed and the communication control unit, which is necessary to communicate with the unit to be reprogrammed.

The unit 120 has one or more processors 120a and one or more memories 120b coupled to the one or more processors 120a. The unit 122 has one or more processors 122a and one or more memories 122b coupled to the one or more processors 122a. The unit 124 has one or more processors 124a and one or more memories 124b coupled to the one or more processors 124a. The processors 120a, 122a, and 124a include, for example, central processing units (CPUs). The memories 120b, 122b, and 124b include, for example, read-only memories (ROMs) and random access memories (RAMs). A ROM is a storage device that stores, for example, programs and arithmetic parameters used by a CPU. A RAM is a storage device that temporarily stores data such as variables and parameters used in processing performed by a CPU.

Note that the units 120, 122, and 124 may be, for example, control units for various electronic devices installed in the vehicle 100. In one example, the units 120, 122, and 124 are, for example, an engine controller, a motor controller, a battery controller, a wireless communicator, a car navigation system controller, an autonomous driving controller, and an IG relay controller. The engine controller controls the engine. The motor controller controls a motor. The battery controller controls the battery 110. The wireless communicator wirelessly communicates with a data center outside the vehicle 100. The car navigation system controller controls a car navigation system. The autonomous driving controller controls autonomous driving of the vehicle 100. The IG relay controller controls ON-OFF of the IG relay 112 of the vehicle 100.

In the present embodiment, one out of the units 120, 122, and 124 is selected as a reprogramming target, and reprogramming is performed. Note that some of the units 120, 122, and 124 may be selected, and reprogramming may be performed.

The reprogramming tool 200 has a connector 202, a tool main body 220, and a cable 230, which couples the connector 202 to the tool main body 220. The connector 202 is for realizing coupling to the diagnostic connector 102 of the vehicle 100.

The tool main body 220 has a tool controller 222. The tool controller 222 has one or more processors 222a and one or more memories 222b, which are coupled to the one or more processors 222a. The one or more processors 222a include, for example, a CPU. The one or more memories 222b include, for example, a ROM and a RAM.

The connector 202 of the reprogramming tool 200 has a tool-side first terminal 204, a tool-side second terminal 206, and a tool-side third terminal 208. The tool-side first terminal 204 is a +B terminal, which is to be coupled to the vehicle-side first terminal 104. The tool-side second terminal 206 is an IG terminal (ignition terminal), which is to be coupled to the vehicle-side second terminal 106. The tool-side third terminal 208 is a communication terminal, which is to be coupled to the vehicle-side third terminal 108.

The tool-side first terminal 204 of the connector 202 of the reprogramming tool 200 is always electrically coupled to the tool controller 222 of the tool main body 220 through a tool-side first line 204a.

The tool-side second terminal 206 of the connector 202 of the reprogramming tool 200 is always electrically coupled to the tool controller 222 of the tool main body 220 through a tool-side second line 206a. Note that, for example, power cables may be used as the tool-side first line 204a and the tool-side second line 206a.

The tool-side third terminal 208 is coupled to the tool controller 222 of the tool main body 220 such that communication is possible through a tool-side third line 208a. Note that, for example, a wired or wireless communication line supporting the CAN protocol may be used as the tool-side third line 208a.

Note that the present embodiment illustrates a case where the tool-side third terminal 208 is provided in the connector 202; however, the tool-side third terminal 208 is not necessarily provided in the connector 202. For example, the tool-side third terminal 208 may be provided in a connector different from the connector 202 of the reprogramming tool 200.

The cable 230 includes the tool-side first line 204a, the tool-side second line 206a, and the tool-side third line 208a.

In a case where the diagnostic connector 102 and the connector 202 are coupled to each other, the vehicle-side first terminal 104 and the tool-side first terminal 204 come into contact, so that the vehicle-side first line 104a and the tool-side first line 204a are electrically coupled to each other.

As described above, regardless of the power state of the vehicle 100, the vehicle-side first line 104a is always electrically coupled to the battery 110 of the vehicle 100. Thus, when the diagnostic connector 102 and the connector 202 are coupled to each other, power is supplied from the battery 110 to the tool controller 222 through the vehicle-side fourth line 107a, the vehicle-side first line 104a, the vehicle-side first terminal 104, the tool-side first terminal 204, and the tool-side first line 204a. In this manner, power supplied from the battery 110 to the tool controller 222 can be used as power necessary for the tool controller 222 to operate.

Note that power supplied from the battery 110 to the tool controller 222 does not have to be used as power necessary for the tool controller 222 to operate. For example, a battery for operation of the reprogramming tool 200 may be provided in the reprogramming tool 200 itself. Alternatively, an external commercial power supply may be used as a power source for operation of the reprogramming tool 200.

Moreover, in a case where the diagnostic connector 102 and the connector 202 are coupled to each other, the vehicle-side second terminal 106 and the tool-side second terminal 206 come into contact, so that the vehicle-side second line 106a and the tool-side second line 206a are electrically coupled to each other.

As described above, in a case where the power state of the vehicle 100 is Ignition ON, the vehicle-side second terminal 106 is electrically coupled to the battery 110. In a case where the power state of the vehicle 100 is Ignition OFF, the vehicle-side second terminal 106 and the battery 110 are electrically decoupled from each other. Thus, in a case where the diagnostic connector 102 and the connector 202 are coupled to each other, the tool controller 222 can identify whether the power state of the vehicle 100 is either Ignition ON or Ignition OFF.

Moreover, in a case where the diagnostic connector 102 and the connector 202 are coupled to each other, the vehicle-side third terminal 108 and the tool-side third terminal 208 come into contact, so that the vehicle-side third line 108a and the tool-side third line 208a are coupled to each other, and the vehicle 100 and the reprogramming tool 200 can communicate with each other.

The reprogramming tool 200 communicates with any one out of the units 120, 122, and 124, which is to be reprogrammed, through the vehicle-side third line 108a and the tool-side third line 208a and performs reprogramming.

In the present embodiment, the connector 202 of the reprogramming tool 200 has a short-circuit mechanism 212, which is a short-circuit line for always short-circuiting the tool-side first line 204a and the tool-side second line 206a. As a result, the tool-side first terminal 204 and the tool-side second terminal 206 are always short-circuited. Note that, for example, a power cable may be used as the short-circuit mechanism 212.

As a result, in a case where the diagnostic connector 102 and the connector 202 are coupled to each other, the vehicle-side first terminal 104, the vehicle-side first line 104a, the vehicle-side second line 106a, the vehicle-side second terminal 106, the tool-side first terminal 204, the tool-side first line 204a, the tool-side second terminal 206, and the tool-side second line 206a are electrically coupled to each other through the short-circuit mechanism 212.

That is, by coupling the diagnostic connector 102 and the connector 202 to each other, the power state of the vehicle 100 can be forcibly switched to Ignition ON regardless of the ON-OFF state of the IG relay 112 of the vehicle 100. As a result, in a case where reprogramming is performed using the reprogramming tool 200, it is possible to reduce the probability of the power state of the vehicle 100 being unintentionally switched to Ignition OFF due to the IG relay 112 being unintentionally switched from ON to OFF. Thus, it is possible to reduce the probability of reprogramming being abnormally discontinued and reprogramming not being able to be normally performed due to the power state of the vehicle 100 being unintentionally switched to Ignition OFF.

Figure 2:
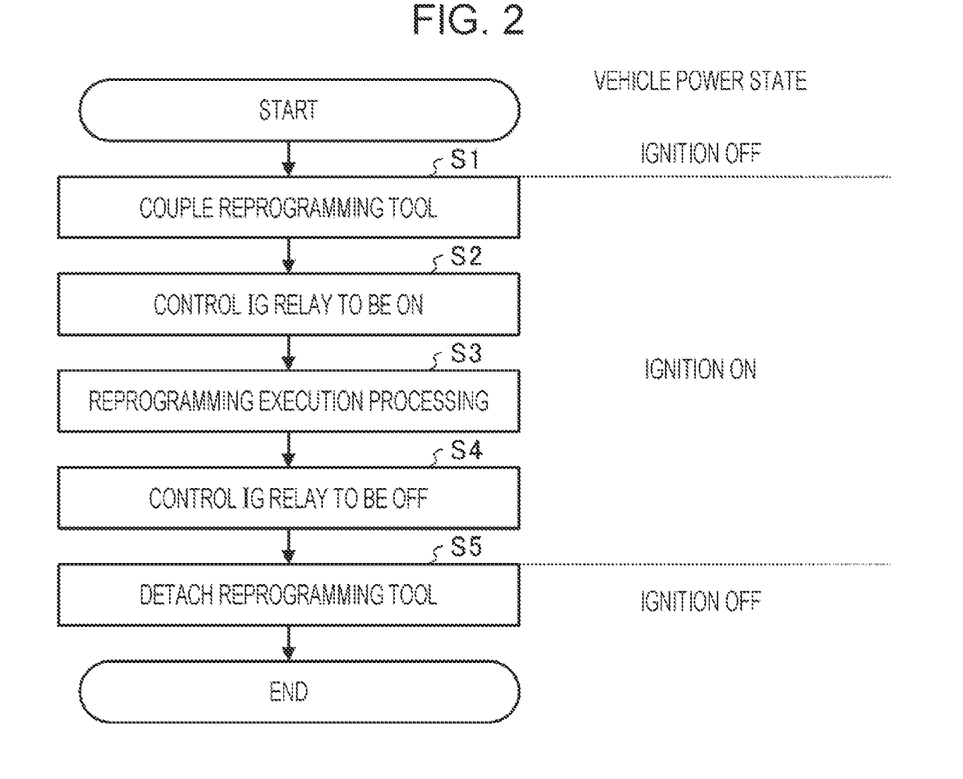
FIG. 2 is a flow chart illustrating the procedure of processing performed by the reprogramming tool according to the embodiment of the disclosure.

FIG. 2 is a flow chart illustrating the procedure of processing performed by the reprogramming tool 200 according to the embodiment of the disclosure. As illustrated in FIG. 2, in a case where the power state of the vehicle 100 is Ignition OFF before the reprogramming tool 200 is coupled to the vehicle 100, when the reprogramming tool 200 is coupled to the vehicle 100 by coupling the connector 202 to the diagnostic connector 102 (step S1), the short-circuit mechanism 212 of the connector 202 of the reprogramming tool 200 causes the power state of the vehicle 100 to be switched to Ignition ON.

Next, when reprogramming is performed, the one or more processors 222a of the tool controller 222 of the reprogramming tool 200 perform control such that the IG relay 112 is switched to ON (step S2).

Next, the one or more processors 222a of the tool controller 222 of the reprogramming tool 200 communicate with any one out of the units 120, 122, and 124 through the vehicle-side third line 108a and the tool-side third line 208a and perform reprogramming execution processing in which reprogramming is performed (step S3).

When the reprogramming execution processing in step S3 described above ends, the one or more processors 222a of the tool controller 222 of the reprogramming tool 200 perform control such that the IG relay 112 is switched to OFF (step S4).

Thereafter, when the diagnostic connector 102 and the connector 202 are decoupled from each other, and the reprogramming tool 200 is detached from the vehicle 100 (step S5), the power state of the vehicle 100 is switched to Ignition OFF. That is, when the IG relay 112 is controlled so as to be OFF in step S4 described above, the power state of the vehicle 100 is forcibly kept at Ignition ON by using the short-circuit mechanism 212 of the connector 202 of the reprogramming tool 200.

Through the processing described above, for example, in a case where the IG relay controller, which controls ON-OFF of the IG relay 112 of the vehicle 100, is reprogrammed in step S3 described above, it is possible to reduce the probability of the power state of the vehicle 100 being unintentionally switched to Ignition OFF due to the IG relay 112 being unintentionally switched from ON to OFF.

Note that, in the present embodiment, the power state of the vehicle 100 is forcibly kept at Ignition ON by using the short-circuit mechanism 212 of the connector 202 of the reprogramming tool 200, and thus ON-OFF of the IG relay 112 in steps S2 and S4 described above does not have to be controlled.

Moreover, for example, the cable 230 and the connector 202 are made detachable from each other. As a result, by simply attaching the connector 202 according to the present embodiment to the cable 230, the reprogramming tool 200 is coupled to the vehicle 100. When the reprogramming tool 200 is coupled to the vehicle 100, it becomes possible to have an effect in that the power state of the vehicle 100 is forcibly kept at Ignition ON by using the short-circuit mechanism 212 of the connector 202 of the reprogramming tool 200.

First Modification

Figure 3:
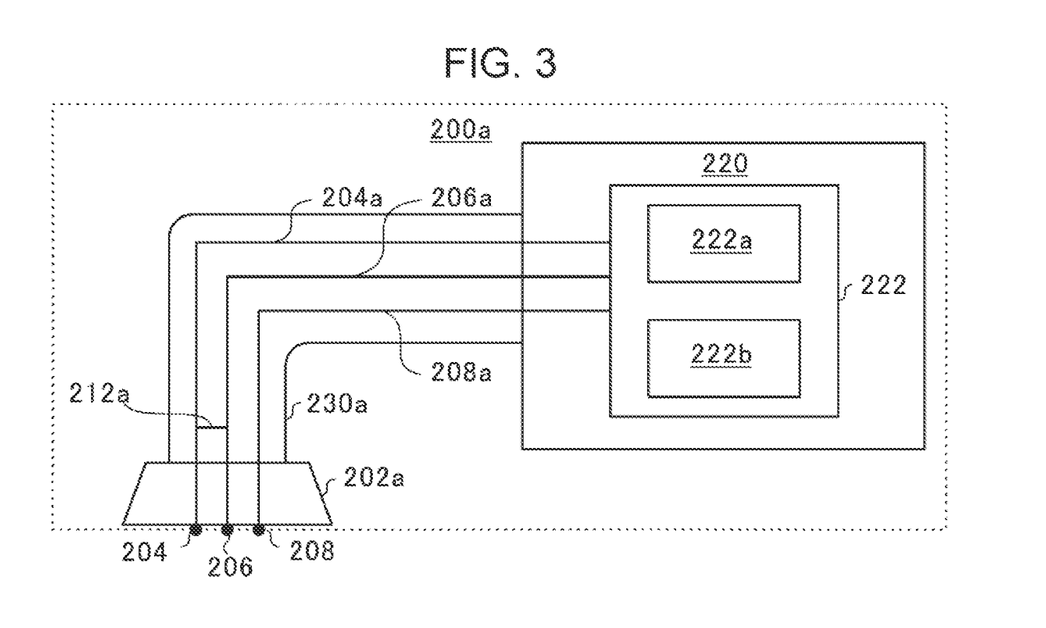
FIG. 3 is a functional block diagram for describing a reprogramming tool according to a first modification of the disclosure.

In the embodiment described above, the case has been illustrated in which the short-circuit mechanism 212 is provided in the connector 202 of the reprogramming tool 200; however, the disclosure is not limited to this. FIG. 3 is a functional block diagram for describing a reprogramming tool 200a according to a first modification of the disclosure. The reprogramming tool 200a according to the first modification differs from the reprogramming tool 200 according to the embodiment described above in that a short-circuit mechanism is not provided in a connector 202a, and a short-circuit mechanism 212a is provided in a cable 230a.

The short-circuit mechanism 212a according to the first modification includes a short-circuit line for always short-circuiting the tool-side first line 204a and the tool-side second line 206a. Note that, as in the first modification, with provision of the short-circuit mechanism 212a in the cable 230a, similarly to as in the embodiment described above, the tool-side first terminal 204 and the tool-side second terminal 206 can always be short-circuited. Note that, for example, a power cable may be used as the short-circuit line of the short-circuit mechanism 212a.

As a result, similarly to as in the embodiment described above, in a case where reprogramming is performed using the reprogramming tool 200a, it is possible to reduce the probability of the power state of the vehicle 100 being unintentionally switched to Ignition OFF due to the IG relay 112 being unintentionally switched from ON to OFF. Thus, it is possible to reduce the probability of reprogramming being abnormally discontinued and reprogramming not being able to be normally performed due to the power state of the vehicle 100 being unintentionally switched to Ignition OFF.

Moreover, for example, the cable 230a and the connector 202a are made detachable from each other. As a result, by simply attaching the connector 202a according to the first modification to the cable 230a, the reprogramming tool 200a is coupled to the vehicle 100. When the reprogramming tool 200a is coupled to the vehicle 100, it becomes possible to have an effect in that the power state of the vehicle 100 is forcibly kept at Ignition ON by using the short-circuit mechanism 212a inside the cable 230a of the reprogramming tool 200a.

Second Modification

Figure 4:
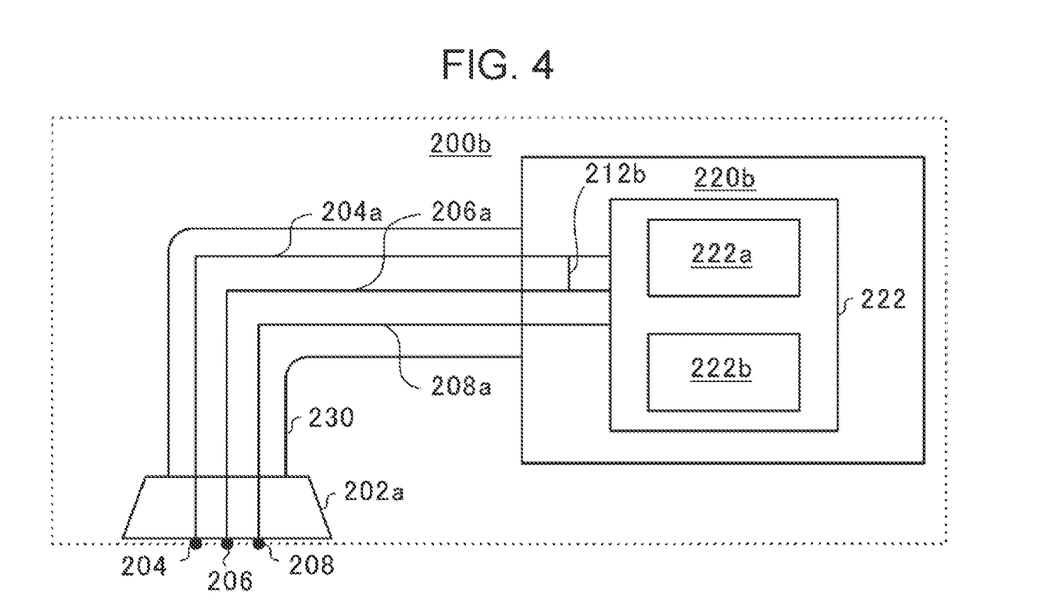
FIG. 4 is a functional block diagram for describing a reprogramming tool according to a second modification of the disclosure.

FIG. 4 is a functional block diagram for describing a reprogramming tool 200b according to a second modification of the disclosure. The reprogramming tool 200b according to the second modification differs from the reprogramming tool 200 according to the embodiment described above or the reprogramming tool 200a according to the first modification described above in that a short-circuit mechanism is not provided in the connector 202a and the cable 230, and a short-circuit mechanism 212b is provided in a tool main body 220b.

The short-circuit mechanism 212b according to the second modification includes a short-circuit line for always short-circuiting the tool-side first line 204a and the tool-side second line 206a. Note that, even with provision of the short-circuit mechanism 212b in the tool main body 220b as in the second modification, similarly to as in the embodiment described above, the tool-side first terminal 204 and the tool-side second terminal 206 can always be short-circuited. Note that, for example, a power cable may be used as the short-circuit line of the short-circuit mechanism 212b.

As a result, similarly to as in the embodiment described above, in a case where reprogramming is performed using the reprogramming tool 200b, it is possible to reduce the probability of the power state of the vehicle 100 being unintentionally switched to Ignition OFF due to the IG relay 112 being unintentionally switched from ON to OFF. Thus, it is possible to reduce the probability of reprogramming being abnormally discontinued and reprogramming not being able to be normally performed due to the power state of the vehicle 100 being unintentionally switched to Ignition OFF.

Moreover, for example, the cable 230 and the tool main body 220b are made detachable from each other. As a result, by simply attaching the tool main body 220b according to the second modification to the cable 230 and the connector 202a, the reprogramming tool 200a is coupled to the vehicle 100. When the reprogramming tool 200a is coupled to the vehicle 100, it becomes possible to have an effect in that the power state of the vehicle 100 is forcibly kept at Ignition ON by using the short-circuit mechanism 212b inside the tool main body 220b of the reprogramming tool 200b.

Third Modification

Figure 5:
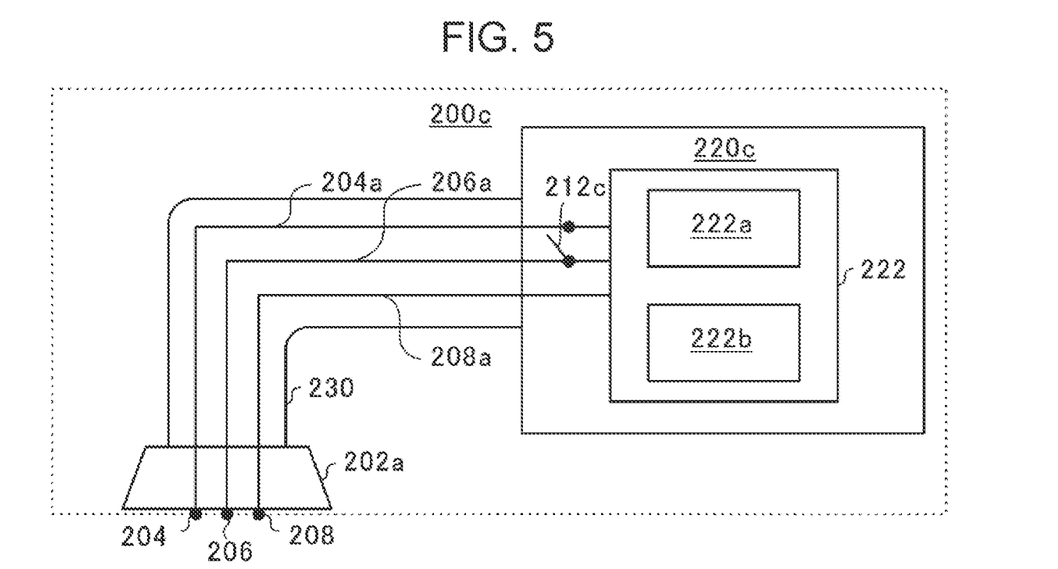
FIG. 5 is a functional block diagram for describing a reprogramming tool according to a third modification of the disclosure.

FIG. 5 is a functional block diagram for describing a reprogramming tool 200c according to a third modification of the disclosure. The reprogramming tool 200c according to the third modification differs from the reprogramming tool 200 according to the embodiment described above, the reprogramming tool 200a according to the first modification described above, or the reprogramming tool 200b according to the second modification described above in that a short-circuit mechanism is not provided in the connector 202a and the cable 230, and a short-circuit mechanism 212c is provided in a tool main body 220c. The short-circuit mechanism 212c can perform switching between the presence and absence of a short circuit.

The short-circuit mechanism 212c according to the third modification includes a short-circuit line and a relay. The short-circuit line short-circuits the tool-side first line 204a and the tool-side second line 206a. The relay is provided partway along the short-circuit line and can short-circuit the tool-side first line 204a and the tool-side second line 206a. Note that the relay of the short-circuit mechanism 212c is controlled by the one or more processors 222a of the tool controller 222 of the tool main body 220c.

In the third modification, when the relay of the short-circuit mechanism 212c is controlled so as to be ON from OFF by the one or more processors 222a of the tool controller 222, the tool-side first line 204a and the tool-side second line 206a are short-circuited and are electrically coupled to each other. That is, when the relay of the short-circuit mechanism 212c is controlled so as to be ON from OFF by the one or more processors 222a of the tool controller 222, the tool-side first terminal 204 and the tool-side second terminal 206 are electrically coupled to each other.

Moreover, when the relay of the short-circuit mechanism 212c is controlled so as to be OFF from ON by the one or more processors 222a of the tool controller 222, the short circuit between the tool-side first line 204a and the tool-side second line 206a is opened, and the tool-side first line 204a and the tool-side second line 206a are electrically decoupled from each other. That is, when the relay of the short-circuit mechanism 212c is controlled so as to be OFF from ON by the one or more processors 222a of the tool controller 222, the tool-side first terminal 204 and the tool-side second terminal 206 are electrically decoupled from each other.

For example, in a case where the tool-side first line 204a and the tool-side second line 206a are always short-circuited by using the short-circuit mechanism 212, 212a, or 212b as in the embodiment describe above, the first modification, or the second modification, the power state of the vehicle 100 is forcibly kept at the Ignition ON state. Thus, in a case where the reprogramming tool 200, 200a, or 200b performs a diagnosis of malfunctions or the like of the unit 120, 122, or 124 of the vehicle 100, it may not be possible to normally perform a diagnosis of malfunctions or the like.

In one example, for example, when the power state of the vehicle 100 is forcibly kept at the Ignition ON state, in a case where a diagnosis target unit for which the reprogramming tool 200, 200a, or 200b performs a diagnosis of malfunctions or the like is the IG relay controller, the power state of the vehicle 100 is not switched even when ON-OFF switching control is performed on the IG relay 112 during diagnosis. As a result, it may not be possible to normally make a diagnosis.

Thus, in the third modification, in a case where the reprogramming tool 200c is to reprogram the unit 120, 122, or 124 of the vehicle 100, the relay of the short-circuit mechanism 212c is controlled so as to be ON by the one or more processors 222a of the tool controller 222, and the power state of the vehicle 100 is forcibly kept at the Ignition ON state.

In contrast, in the third modification, in a case where the reprogramming tool 200c is to perform a diagnosis of malfunctions or the like of the unit 120, 122, or 124 of the vehicle 100, the relay of the short-circuit mechanism 212c is controlled so as to be OFF by the one or more processors 222a of the tool controller 222, and the power state of the vehicle 100 is switched in response to ON-OFF control of the IG relay 112.

Figure 6:
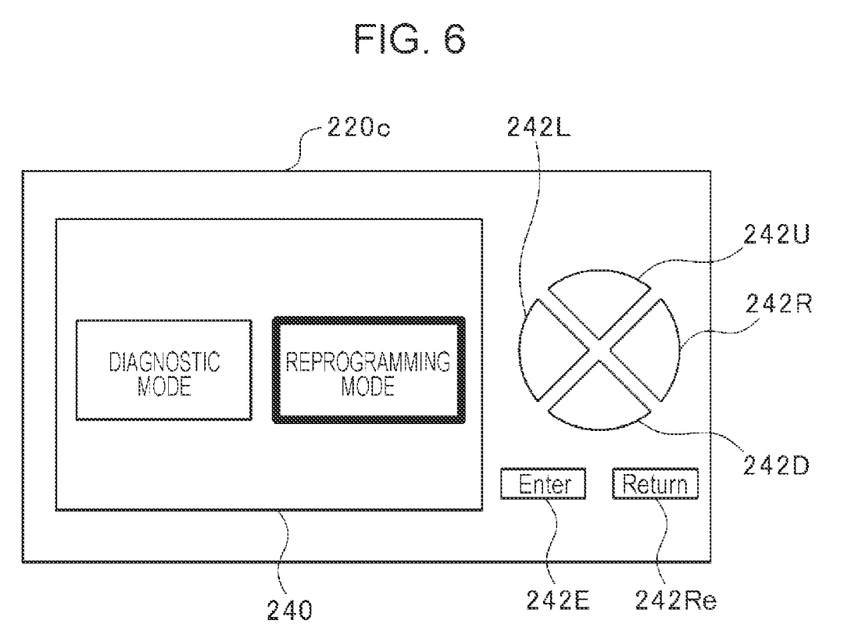
FIG. 6 is a diagram illustrating an example of content displayed on a display of a tool main body according to the third modification of the disclosure.

FIG. 6 is a diagram illustrating an example of content displayed on a display 240 of the tool main body 220c according to the third modification of the disclosure. As illustrated in FIG. 6, the tool main body 220c has the display 240, which can display various images. The images displayed on the display 240 are controlled by the one or more processors 222a of the tool controller 222.

Moreover, as illustrated in FIG. 6, the tool main body 220c has operation members 242R, 242L, 242U, 242D, 242E, and 242Re, which can accept operation inputs from operators. In one example, the operation member 242R accepts operation inputs for operation in the right direction, the operation member 242L accepts operation inputs for operation in the left direction, the operation member 242U accepts operation inputs for operation in the upward direction, the operation member 242D accepts operation inputs for operation in the downward direction, the operation member 242E accepts operation inputs for confirmation operation, and the operation member 242Re accepts operation inputs for cancellation operation. Upon detecting operation inputs through the various operation members 242R, 242L, 242U, 242D, 242E, and 242Re, the one or more processors 222a of the tool controller 222 perform operations corresponding to the operation inputs.

When the reprogramming tool 200c is coupled to the vehicle 100, the one or more processors 222a of the tool controller 222 display a menu screen on the display 240 of the tool main body 220c. The menu screen displays an icon labeled "diagnostic mode" and an icon labeled "reprogramming mode".

When a confirmation operation is input through the operation member 242E, and the icon labeled "diagnostic mode" is selected on the menu screen, the one or more processors 222a of the tool controller 222 start performing a diagnosis of malfunctions or the like. Moreover, when a confirmation operation is input through the operation member 242E, and the icon labeled "reprogramming mode" is selected on the menu screen, the one or more processors 222a of the tool controller 222 start execution of reprogramming.

Figure 7:
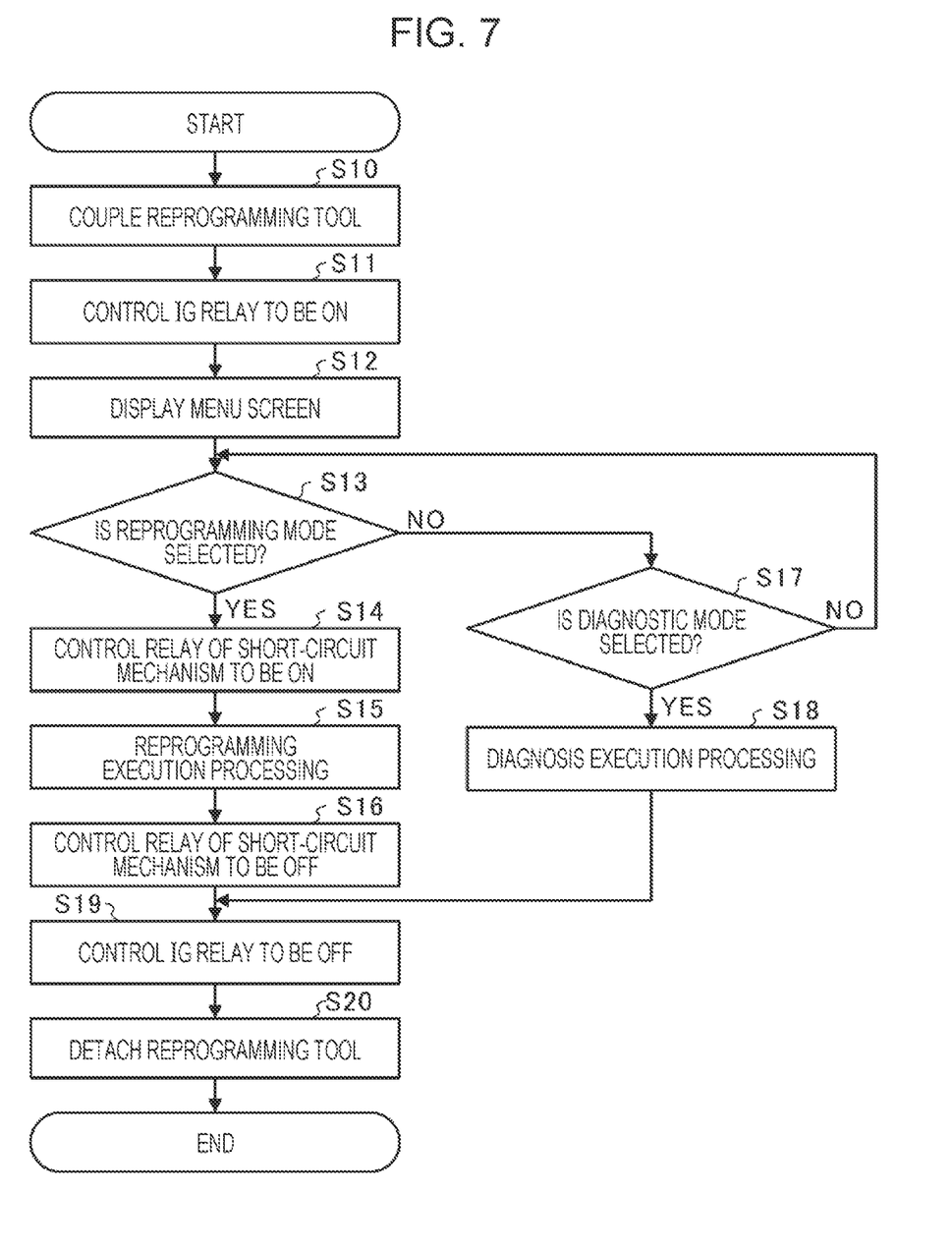
FIG. 7 is a flow chart for describing the procedure of processing performed by the reprogramming tool according to the third modification of the disclosure.

FIG. 7 is a flow chart for describing the procedure of processing performed by the reprogramming tool 200c according to the third modification of the disclosure. In a case where the power state of the vehicle 100 is Ignition OFF before the reprogramming tool 200c is coupled to the vehicle 100, when the reprogramming tool 200c is coupled to the vehicle 100 by coupling the connector 202a of the reprogramming tool 200c to the diagnostic connector 102 of the vehicle 100 (step S10), the IG relay 112 is controlled so as to be ON by the one or more processors 222a of the tool controller 222 of the reprogramming tool 200c (step S11). Note that the IG relay 112 may be controlled so as to be ON in step S11 by an operator performing a vehicle operation. Note that, at an early stage when the reprogramming tool 200c is coupled to the vehicle 100, the relay of the short-circuit mechanism 212c is controlled so as to be OFF.

Next, the one or more processors 222a of the tool controller 222 of the reprogramming tool 200c display, on the display 240 of the tool main body 220c, the menu screen illustrated in FIG. 6 (step S12).

When the icon labeled "reprogramming mode" is selected on the menu screen (YES in step S13), the relay of the short-circuit mechanism 212c is controlled so as to be ON by the one or more processors 222a of the tool controller 222 of the reprogramming tool 200c (step S14). The one or more processors 222a of the tool controller 222 of the reprogramming tool 200c communicate with any one out of the units 120, 122, and 124, which will be a reprogramming target, through the vehicle-side third line 108a and the tool-side third line 208a, and perform reprogramming execution processing in which reprogramming is performed (step S15).

When the reprogramming execution processing in step S15 described above ends, the relay of the short-circuit mechanism 212c is controlled so as to be OFF by the one or more processors 222a of the tool controller 222 of the reprogramming tool 200c (step S16). As a result, in a case where the unit 120, 122, or 124 of the vehicle 100 is reprogrammed by the reprogramming tool 200c, the relay of the short-circuit mechanism 212c is controlled so as to be ON by the one or more processors 222a of the tool controller 222, and the power state of the vehicle 100 is forcibly kept at the Ignition ON state.

In contrast, when the icon labeled "diagnostic mode" is selected on the menu screen (YES in step S17), the one or more processors 222a of the tool controller 222 of the reprogramming tool 200c communicate with any one out of the units 120, 122, and 124, which will be a diagnosis target regarding malfunctions or the like, through the vehicle-side third line 108a and the tool-side third line 208a, and perform diagnosis execution processing in which diagnosis is performed (step S18). As a result, in a case where the reprogramming tool 200c performs a diagnosis of malfunctions or the like of the unit 120, 122, or 124 of the vehicle 100, the power state of the vehicle 100 is switched in response to ON-OFF control of the IG relay 112.

Note that, in the diagnosis execution processing in step S18, for example, in a case where the diagnosis target unit for which the reprogramming tool 200c performs a diagnosis of malfunctions or the like is the IG relay controller, a diagnosis of malfunctions or the like may be performed by controlling ON-OFF switching of the IG relay 112 as needed during diagnosis. That is, in the third modification, even in a case where a unit for which ON-OFF control of the IG relay 112 is involved to perform diagnosis is a diagnosis target, diagnosis can be normally performed.

Note that, in a case where neither the icon labeled "reprogramming mode" nor the icon labeled "diagnostic mode" is selected on the menu screen (NO in step S13 and No in step S17), the one or more processors 222a of the tool controller 222 go on standby.

When processing in step S16 or S18 described above ends, the IG relay 112 is controlled so as to be OFF by the one or more processors 222a of the tool controller 222 of the reprogramming tool 200c (step S19).

Thereafter, when the diagnostic connector 102 and the connector 202a are decoupled from each other, and the reprogramming tool 200c is detached from the vehicle 100 (step S20), the procedure ends.

As described above, the reprogramming tools 200, 200a, 200b, and 200c according to the above-described embodiment, the first modification, the second modification, and the third modification have the connectors 202 and 202a, which are to be detachably coupled to the diagnostic connector 102 of the vehicle 100. The diagnostic connector 102 has the vehicle-side first terminal 104 and the vehicle-side second terminal 106. The vehicle-side first terminal 104 is always coupled to the battery 110 of the vehicle 100, and the vehicle-side second terminal 106 is coupled to the battery 110 when the power state of the vehicle 100 is Ignition ON. The connectors 202 and 202a of the reprogramming tools 200, 200a, 200b, and 200c have the tool-side first terminal 204 and the tool-side second terminal 206. The tool-side first terminal 204 is to be coupled to the vehicle-side first terminal 104 of the diagnostic connector 102, and the tool-side second terminal 206 is to be coupled to the vehicle-side second terminal 106 of the diagnostic connector 102. The reprogramming tools 200, 200a, 200b, and 200c have the short-circuit mechanisms 212, 212a, 212b, and 212c, which can short-circuit the tool-side first terminal 204 and the tool-side second terminal 206.

The reprogramming tools 200, 200a, 200b, and 200c according to the above-described embodiment, the first modification, the second modification, and the third modification make it possible to reduce the probability of reprogramming being abnormally discontinued and reprogramming not being able to be normally performed due to the power state of the vehicle 100 being unintentionally switched to Ignition OFF in a case where reprogramming is performed using the reprogramming tools 200, 200a, 200b, and 200c. Thus, reprogramming using the reprogramming tools 200, 200a, 200b, and 200c can be normally performed.

Moreover, the short-circuit mechanisms 212, 212a, and 212b of the reprogramming tools 200, 200a, and 200b according to the above-described embodiment, the first modification, and the second modification include short-circuit lines that always short-circuit the tool-side first terminal 204 and the tool-side second terminal 206.

The reprogramming tools 200, 200a, and 200b according to the above-described embodiment, the first modification, and the second modification make it possible to reduce the probability of the power state of the vehicle 100 being unintentionally switched to Ignition OFF due to the IG relay 112 being unintentionally switched from ON to OFF in a case where, for example, reprogramming of the IG relay controller is performed.

Moreover, the reprogramming tool 200c according to the third modification described above has the one or more processors 222a and the one or more memories 222b, which are coupled to the one or more processors 222a. The one or more processors 222a cause the short-circuit mechanism 212c to short-circuit the tool-side first terminal 204 and the tool-side second terminal 206 in a case where the unit 120, 122, or 124 provided in the vehicle 100 is reprogrammed. The one or more processors 222a do not cause the short-circuit mechanism 212c to short-circuit the tool-side first terminal 204 and the tool-side second terminal 206 in a case where a diagnosis of the unit 120, 122, or 124 is performed.

The reprogramming tool 200c according to the third modification described above makes it possible to reduce the probability of reprogramming being abnormally discontinued and reprogramming not being able to be normally performed due to the power state of the vehicle 100 being unintentionally switched to Ignition OFF in a case where the unit 120, 122, or 124 of the vehicle 100 is reprogrammed. Thus, reprogramming using the reprogramming tools 200, 200a, 200b, and 200c can be normally performed. Furthermore, in a case where the reprogramming tool 200c performs a diagnosis of malfunctions or the like of the unit 120, 122, or 124 of the vehicle 100, use of the short-circuit mechanism 212c can reduce the probability of an adverse effect on the diagnosis of malfunctions or the like.

Moreover, in the above-described embodiment, the first modification, the second modification, and the third modification, the vehicle-side first terminal 104 and the tool-side first terminal 204 may be +B terminals, and the vehicle-side second terminal 106 and the tool-side second terminal 206 may be IG terminals. In general, the diagnostic connectors of vehicles often have a +B terminal and an IG terminal, and thus reprogramming can be normally performed without adding any changes to the vehicle 100 and by simply using the reprogramming tools 200, 200a, 200b, and 200c according to the above-described embodiment, the first modification, the second modification, and the third modification.

As described above, the embodiments of the disclosure have been described with reference to the attached drawings; however, the disclosure is not limited to these embodiments. It is clear that those skilled in the art can conceive various examples of changes or modifications within the scope of the claims, and thus it is to be understood that these various examples of changes or modifications are also included in the technical scope of the disclosure.

Note that the case where the vehicle 100 is a hybrid vehicle has been described in the above-described embodiments; however, the disclosure is not limited to this case. The disclosure can be applied to various types of vehicle such as gasoline-driven vehicles, electric vehicles (EVs), plug-in hybrid electric vehicles (PHEVs), and non-plug-in hybrid electric vehicles (hybrid vehicles).

The invention claimed is:

1. A reprogramming tool comprising a connector configured to be detachably coupled to a diagnostic connector with which a vehicle is provided,
the diagnostic connector comprising a vehicle-side first terminal, a vehicle-side second terminal, a vehicle-side third terminal, the vehicle-side first terminal being always coupled to a battery of the vehicle, the vehicle-side second terminal being coupled to the battery through an ignition relay that is configured to connect the vehicle-side second terminal and the battery in a case where a power state of the vehicle is a state in which an ignition is ON, the vehicle-side third terminal being coupled to a unit in the vehicle to be reprogrammed,
the connector of the reprogramming tool comprising:
a tool-side first terminal configured to be coupled to the vehicle-side first terminal of the diagnostic connector;
a tool-side second terminal configured to be coupled to the vehicle-side second terminal of the diagnostic connector; and
a tool-side third terminal configured to be coupled to the vehicle-side second terminal of the diagnostic connector,
the reprogramming tool comprising a short-circuit mechanism configured to short-circuit the tool-side first terminal and the tool-side second terminal.

2. The reprogramming tool according to claim 1, further comprising:
one or more processors; and
one or more memories coupled to the one or more processors, wherein
the one or more processors is configured to
cause the short-circuit mechanism to short-circuit the tool-side first terminal and the tool-side second terminal in a case where the unit provided in the vehicle is reprogrammed, and
do not cause the short-circuit mechanism to short-circuit the tool-side first terminal and the tool-side second terminal in a case where a diagnosis of the unit is performed.

3. The reprogramming tool according to claim 2, wherein
the vehicle-side first terminal and the tool-side first terminal are positive terminals, and
the vehicle-side second terminal and the tool-side second terminal are ignition terminals.

4. The reprogramming tool according to claim 1, wherein the short-circuit mechanism comprises a short-circuit line configured to always short-circuit the tool-side first terminal and the tool-side second terminal.

5. The reprogramming tool according to claim 4, wherein
the vehicle-side first terminal and the tool-side first terminal are positive terminals, and
the vehicle-side second terminal and the tool-side second terminal are ignition terminals.

6. The reprogramming tool according to claim 1, wherein
the vehicle-side first terminal and the tool-side first terminal are positive terminals, and
the vehicle-side second terminal and the tool-side second terminal are ignition terminals.

7. A reprogramming tool comprising a connector configured to be detachably coupled to a diagnostic connector with which a vehicle is provided,
the diagnostic connector comprising a vehicle-side first terminal and a vehicle-side second terminal, the vehicle-side first terminal being always coupled to a battery of the vehicle, the vehicle-side second terminal being coupled to the battery in a case where a power state of the vehicle is a state in which an ignition is ON,
the connector of the reprogramming tool comprising:
a tool-side first terminal configured to be coupled to the vehicle-side first terminal of the diagnostic connector; and
a tool-side second terminal configured to be coupled to the vehicle-side second terminal of the diagnostic connector,
the reprogramming tool comprising:
a short-circuit mechanism configured to short-circuit the tool-side first terminal and the tool-side second terminal;
one or more processors; and
one or more memories coupled to the one or more processors, wherein the one or more processors is configured to:
cause the short-circuit mechanism to short-circuit the tool-side first terminal and the tool-side second terminal in a case where a unit provided in the vehicle is reprogrammed; and
do not cause the short-circuit mechanism to short-circuit the tool-side first terminal and the tool-side second terminal in a case where a diagnosis of the unit is performed.

8. The reprogramming tool according to claim 7, wherein
the vehicle-side first terminal and the tool-side first terminal are positive terminals, and
the vehicle-side second terminal and the tool-side second terminal are ignition terminals.

9. A reprogramming system for reprogramming a unit in a vehicle, the reprogramming system comprising:
a diagnostic connector of a vehicle comprising:
a vehicle-side first terminal always coupled to a battery of the vehicle;
a vehicle-side second terminal coupled to the battery through an ignition relay that is configured to couple the vehicle-side second terminal to the battery when a power state of an ignition is in an ON state; and
a vehicle-side third terminal coupled to the unit to be reprogrammed; and
a reprogramming tool comprising:
a connector configured to be detachably coupled to the diagnostic connector, the connector of comprising:

a tool-side first terminal configured to be coupled to the vehicle-side first terminal of the diagnostic connector;
a tool-side second terminal configured to be coupled to the vehicle-side second terminal of the diagnostic connector; and
a tool-side third terminal configured to be coupled to the vehicle-side second terminal of the diagnostic connector; and
a short-circuit mechanism configured to create a short-circuit between the tool-side first terminal and the tool-side second terminal.

\* \* \* \* \*